(12) United States Patent
Rutkowski

(10) Patent No.: US 7,246,809 B2
(45) Date of Patent: Jul. 24, 2007

(54) RECUMBENT BICYCLE

(76) Inventor: Gerd Rutkowski, 2302 Emily Crescent, Cornwall, Ontario (CA) K6H 7H5

(*) Notice: Subject to any disclaimer, the term of this patent is extended or adjusted under 35 U.S.C. 154(b) by 309 days.

(21) Appl. No.: 10/880,016

(22) Filed: Jun. 30, 2004

(65) Prior Publication Data
US 2006/0001231 A1  Jan. 5, 2006

(51) Int. Cl.
B62M 1/02 (2006.01)
(52) U.S. Cl. .................. 280/259; 280/279
(58) Field of Classification Search ........... 280/259, 280/260, 261, 275, 279; 301/1, 110.5, 105.1, 301/111, 124.2; 384/545
See application file for complete search history.

(56) References Cited

U.S. PATENT DOCUMENTS

| | | | | |
|---|---|---|---|---|
| 2,497,121 A | * | 2/1950 | Fletcher | 280/261 |
| 2,505,464 A | * | 4/1950 | Debuit | 280/260 |
| 3,910,599 A | | 10/1975 | Thomas | |
| 4,170,369 A | | 10/1979 | Strutman | |
| 4,773,663 A | | 9/1988 | Sawyer et al. | |
| 5,380,027 A | * | 1/1995 | Pong et al. | 280/279 |
| 5,452,381 A | * | 9/1995 | Guerra | 384/545 |
| 6,193,323 B1 | * | 2/2001 | Lin | 301/110.5 |
| 6,267,401 B1 | * | 7/2001 | De Jong | 280/287 |
| 6,349,784 B1 | | 2/2002 | van der Heide | |
| 6,419,254 B1 | | 7/2002 | Langen | |
| 6,536,550 B2 | * | 3/2003 | Schmidt et al. | 180/209 |
| 6,619,683 B1 | * | 9/2003 | Lin et al. | 280/270 |
| 6,942,235 B2 | * | 9/2005 | Chang | 280/278 |
| 2006/0108858 A1 | * | 5/2006 | Mercat et al. | 301/79 |

FOREIGN PATENT DOCUMENTS

JP  3-281487  * 12/1991

* cited by examiner

Primary Examiner—Anne Marie Boehler (57) ABSTRACT

A bicycle having a frame with a single steering arm rotatably mounted in the frame and extending downwardly away from the frame. A wheel support is provided at the end of the arm and a front wheel is rotatably mounted on the wheel support with a single bearing. The bicycle can have a pair of frame arms extending down from the frame with the steering arm between the frame arms and adjacent one of the arms so the front wheel is located between the arms. The frame arms carry pedal means with the axle of the pedal means passing freely through the hub of the front wheel and through the wheel support without connecting to them. Drive means are provided between the pedal axle and the front wheel for propelling the bicycle.

20 Claims, 6 Drawing Sheets

RECUMBENT BICYCLE

BACKGROUND OF THE INVENTION

1. Field of the Invention

This invention is directed toward a bicycle. The invention is more particularly directed toward a bicycle having a front steering wheel rotatably supported on a single steering arm. The bicycle, in a preferred embodiment, has the axle of the pedals mounted through the front wheel.

2. Description of the Related Art

The front wheel of a bicycle is usually mounted between the arms of a front fork, the fork a part of the frame of the bicycle and used to steer the bicycle. The front wheel is freely rotatable in the front fork and the pedal means for propelling the bicycle is mounted on the frame behind the front wheel and connected by drive means to the rear wheel. It is known to mount the front wheel on a single support arm to provide a front wheel mount that allows easy removal of the front wheel, as shown in U.S. Pat. No. 4,170,369. It is also known to mount the front wheel on a single support arm to provide a narrow front wheel mount as shown in U.S. Pat. No. 6,419,254. However, in both cases, the front wheel is supported by two, relatively large, spaced-apart bearings making the mounting costly and inefficient.

Recumbent bicycles are bicycles where the rider is in a lowered, sitting position on the frame of the bicycle with his feet extending forward to operate the pedals which drive the bicycle. Some recumbent bicycles have a long wheelbase with the pedals in front of the driver and the front wheel in front of the pedals. Other recumbent bicycles have a short wheelbase with the front wheel in front of the driver and the pedals usually on top of the front wheel, the front wheel being relatively small to accommodate the pedals on the top of the wheel. Short wheelbase recumbent bicycles are easier to turn than long wheelbase recumbents and are therefore better suited for city use.

It is known to provide a short wheelbase recumbent bicycle where the pedal axle goes through the center of the front wheel. An example is shown in U.S. Pat. No. 3,910,599. This arrangement allows the front wheel to be larger, making steering easier, and places the operator's feet in a more comfortable position. However, the driving and steering means are quite complicated and the driving means require the use of a number of bearings making the bicycle inefficient.

Other pedal bicycles are known where the pedal axle of the drive means passes through the front wheel of the bicycle. Examples are shown in U.S. Pat. No. 4,773,663, relating to a long wheelbase recumbent bicycle, and the above mentioned U.S. Pat. No. 6,419,254 relating to a regular bicycle or tricycle. In both these bicycles however, the front wheel is supported by two spaced-apart bearings and thus is quite inefficient. In addition, the relationship between the pedal axle and the hub of the bicycle, allowing movement of the front wheel of the bicycle relative to the pedal axle to steer the bicycle, is quite complicated and again quite inefficient.

SUMMARY OF THE INVENTION

It is the purpose of the present invention, in its simplest form, to provide a bicycle with a single steering arm on which the front wheel of the bicycle is mounted in a simple, efficient manner. In accordance with the present invention, the front wheel of the bicycle is mounted in cantilever fashion on the steering arm by a single, relatively small, annular bearing. Using a single bearing to mount the front wheel on the steering arm greatly reduces the running friction of the front wheel making it easier to peddle the bicycle and also provides a compact and lightweight wheel mounting.

It is another purpose of the present invention to provide a bicycle with a single steering arm on which the front wheel of the bicycle is mounted in a simple efficient manner and in which the pedal means of the bicycle has the pedal axle passing through the front wheel. The front wheel is mounted in cantilevered fashion on the steering arm by a single, relatively small, annular bearing, and the pedal axle passes through the bearing and the wheel mounting without connecting with them and in a manner allowing the wheel to easily turn relative to the pedal axle. Drive means are connected between the pedal axle and one of the wheels of the bicycle, preferably the front wheel, for driving the bicycle when pedaled. In a preferred embodiment the bicycle is a short wheelbase recumbent bicycle.

The mounting for the front wheel on the steering arm has a cylindrical, tubular, wheel support on the end of the steering arm extending transversely from the steering arm in cantilever fashion. The mounting includes a cylindrical, tubular, bearing support on the hub of the wheel extending toward the steering arm. The bearing support on the wheel is mounted concentrically within the wheel support on the arm with the single bearing press-fit mounted between the two supports to allow the front wheel to freely rotate relative to the steering arm.

The pedal axle, passing through the wheel mounting and wheel hub, is rotatably mounted between the frame arms of a front fork, the steering arm located between the arms and adjacent one of the arm to locate the front wheel generally centrally between the frame arms. The location of the pedal axle, passing through the front wheel, makes the arrangement very suitable for short wheel base recumbent bicycles. The pedals are located in a comfortable location for a recumbent driver and allow the recumbent bicycle to have a large front wheel which provides easier steering.

A frame arm reinforcement member can be provided between the frame arms to strengthen the structure. Connecting means can also be provided between the steering arm and the adjacent frame arm above the wheel support to strengthen the steering arm. The connecting means are constructed to allow the steering arm to move relative to the frame arm while maintaining the connection to the frame arm.

The drive means for the recumbent bicycle preferably comprise chain and sprocket drives extending from the pedal axle to a transfer axle on the bike frame and from the transfer axle to the front wheel hub. With the unique mounting of the front wheel, and its spatial relation with the pedal axle, the bike is both easy to pedal and to steer.

The invention is particularly directed toward a bicycle having a frame and a steering arm rotatably mounted in the frame and extending downwardly away from the frame. A cylindrical, tubular, wheel support is provided at the end of the arm. The support is mounted adjacent one end to the end of the arm and extends transversely from the arm. The bicycle has a front wheel having a hub with a cylindrical, tubular, bearing support on the hub. One of the wheel support and the bearing support is insertable into the other when mounting the wheel on the steering arm and a single, annular, bearing is mounted between the bearing support and the wheel support for rotatably mounting the front wheel on the end of the steering arm.

The invention is also particularly directed toward a bicycle having a frame with a top, front steering post and two frame arms extending down from the frame adjacent the steering post, one frame arm on each side of the post. A steering arm is rotatably mounted in the steering post and extends down between the frame arms and alongside one of the frame arms. A tubular wheel support is on the end of the steering arm and extends transversely from the steering arm toward the other frame arm. The bicycle has a front wheel with a hub and a single annular bearing connects the hub to the tubular support to have the wheel rotatable, via its hub, about the tubular support between the frame arms. Pedal means are mounted on the bottom ends of the frame arms. The pedal means has a pedal axle rotatably supported by the bottom ends of the frame arms and passing freely through the wheel hub and the tubular support without connecting with them. Drive means connect the pedal axle to the wheel hub to rotate the front wheel when pedaling.

DESCRIPTION OF THE PREFERRED EMBODIMENTS

Figure 1:
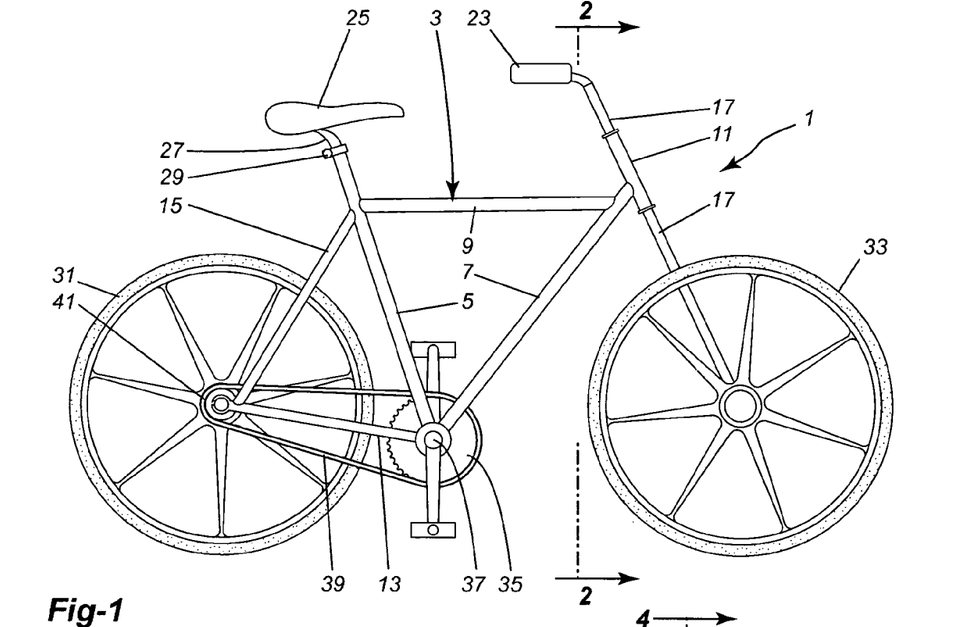
FIG. 1 is a side view of one embodiment of the bicycle.
Figure 2:
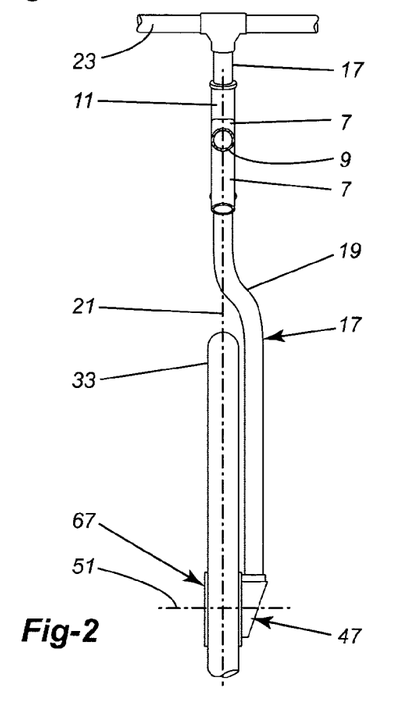
FIG. 2 is a partial cross-section view of the bicycle taken along 2-2 in FIG. 1.

The bicycle 1 of the present invention, in one embodiment as shown in FIGS. 1 and 2, is a standard bicycle and has a frame 3. The frame 3 has an upwardly and slightly rearwardly directed seat post 5. A lower frame member 7 extends upwardly and forwardly from the bottom of the seat post 5 and an upper frame member 9 extends forwardly from the top of the seat post 5. The lower and upper frame members 7, 9 connect to a front, relatively short, steering post 11, the steering post extending downwardly and angled slightly forwardly. The frame 3 includes a first rear fork 13 extending rearwardly from bottom of the seat post 5 and a second rear fork 15 extending downwardly and rearwardly from the top of the seat post 5. The bottom end of the second rear fork 15 is joined to the back end of the first rear fork 13.

A steering arm 17 extends down through the front post 11, the arm 17 offset to one side just below the post 11, as shown at 19, to extend downwardly parallel to the longitudinal steering axis 21 of the steering post 11 but spaced a short distance from it. A handle bar 23 is connected to the top of the steering arm 17 above the post 11. The steering arm 17 is rotatable in the post 11 about the steering axis 21.

A saddle seat 25 is mounted on a mounting post 27 which is slidably inserted into the seat post 5. A clamp 29 on the seat post 5 locks the mounting post 27 in place. A rear wheel 31 is rotatably mounted at the end of the rear forks 13, 15. A front wheel 33 is rotatably mounted to the bottom end of the steering arm 17 as will be described, the front wheel centered with respect to the steering axis 21 and adjacent the steering arm 17. The bicycle has standard drive means with a drive sprocket 35, having pedals, rotatably mounted to the frame 3 in a hub 37 at the bottom of the seat post 5. A drive chain 39 extends from the drive sprocket 35 to a driven sprocket 41 connected to the rear wheel 31.

Figure 3:
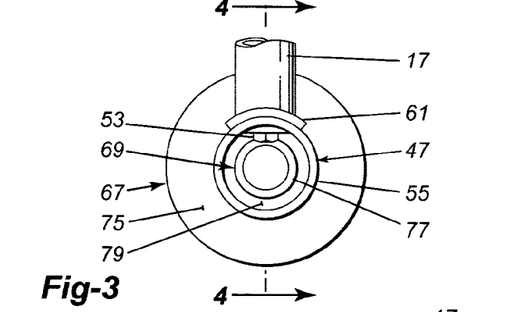
FIG. 3 is a detail side view showing the wheel mounted on the steering arm.
Figure 4:
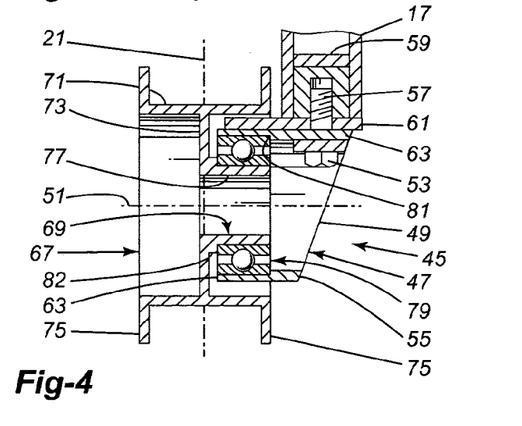
FIG. 4 is a cross-section taken along line 4-4 in FIG. 3.

The front wheel 33 is mounted in cantilevered fashion to the bottom end of the steering arm 17 by a wheel mounting 45. The wheel mounting 45 has a cylindrical, tubular, wheel support 47. The wheel support 47, as shown in FIGS. 3 and 4, is connected adjacent one side 49 to the bottom of the steering arm 17 with its longitudinal axis 51 transverse to the steering axis 21 of the steering post 11. The wheel support 47 is connected by a bolt 53 passing through a hole in the wall 55 of the support 47 into a threaded hole 57 in a mounting block 59 fixed in the bottom end of the steering arm 17. A curved support plate 61 is mounted onto the bottom end of the steering arm 17 against which the wheel support 47 can be located when being connected to the steering arm 17, the plate 61 also having a hole through which the bolt 53 passes.

The wheel support 47 extends from the steering arm 17, when mounted thereon, in cantilevered fashion to have its other side 63 adjacent the steering axis 21. The support plate 61 can also extend past the steering arm 17 to support the cantilevered wheel support 47 against upward forces. The one side 49 of the wheel support can be angled, as shown in FIG. 4 to provide easier access to the bolt 53, the side 49 extending downwardly and toward the steering axis 21. The other side 63 of the wheel support 47 is parallel to the steering axis 21. While one arrangement, using a single bolt 53, has been used to connect the wheel support 47 to the steering arm 17, other arrangements can be used.

The front wheel 33 has an enlarged hub 67. The hub 67 has an inner, cylindrical, tubular member 69 and an outer, cylindrical, tubular member 71, the tubular members 69, 71 joined by a central flange 73. The inner tubular member 69 extends from one side of the flange 73 forming a bearing support 77 and forms a part of the wheel mounting 45. The outer tubular member 71 has a radially outwardly directed flange 75 on each side to which the wheel spokes (not shown) of the front wheel 33 are attached.

The front wheel 33 is rotatably mounted on the wheel support 47 on the steering arm 17 by inserting the bearing support 77 on the wheel hub 67 within the wheel support 47 from its other side 63.

The wheel support 45 includes a single, annular, bearing 79, preferably a ball bearing, press-fit onto the bearing support 77 of the hub 67, and press-fit within the wheel support 47 to rotatably connect the wheel 33 to the wheel support 47. The wall 55 of the wheel support 47 can be counter bored inwardly from the other side 63 to provide a stop shoulder 81 to locate the inner side of the bearing 79. A stop shoulder 82 can be formed on the bearing support 77 adjacent the central flange 73 to very slightly space bearing 79 from the flange 73 as shown.

When the front wheel is mounted as described above, the outer tubular member 71 of the hub 67 is vertically centered with respect to the steering axis 21 with the bearing support 77 extending toward the steering arm 17. The other side 63 of the wheel support 47 is closely adjacent to the central flange 73. The bearing 79 is adjacent to the steering axis 21. The front wheel 33 is well supported with the bearing 79 adjacent the steering axis 21.

The single bearing mounting of the front wheel, in cantilever fashion, onto a single steering arm simplifies the construction of the bicycle. The single bearing can be quite small, no more than three inches in outside diameter, and preferably around two and a half inches in diameter. The relatively small size of the single bearing minimizes rolling friction.

The single bearing wheel mounting of the front wheel, as described above, also permits the wheel mounting to be used on bicycles of the type with the pedal means, which operate the bicycle, having its pedal axle passing through the hub of the front wheel and the mounting. Bicycles, with the pedal axle passing through the hub of the front wheel, are particularly suited for use as recumbent bicycles.

Figure 5:
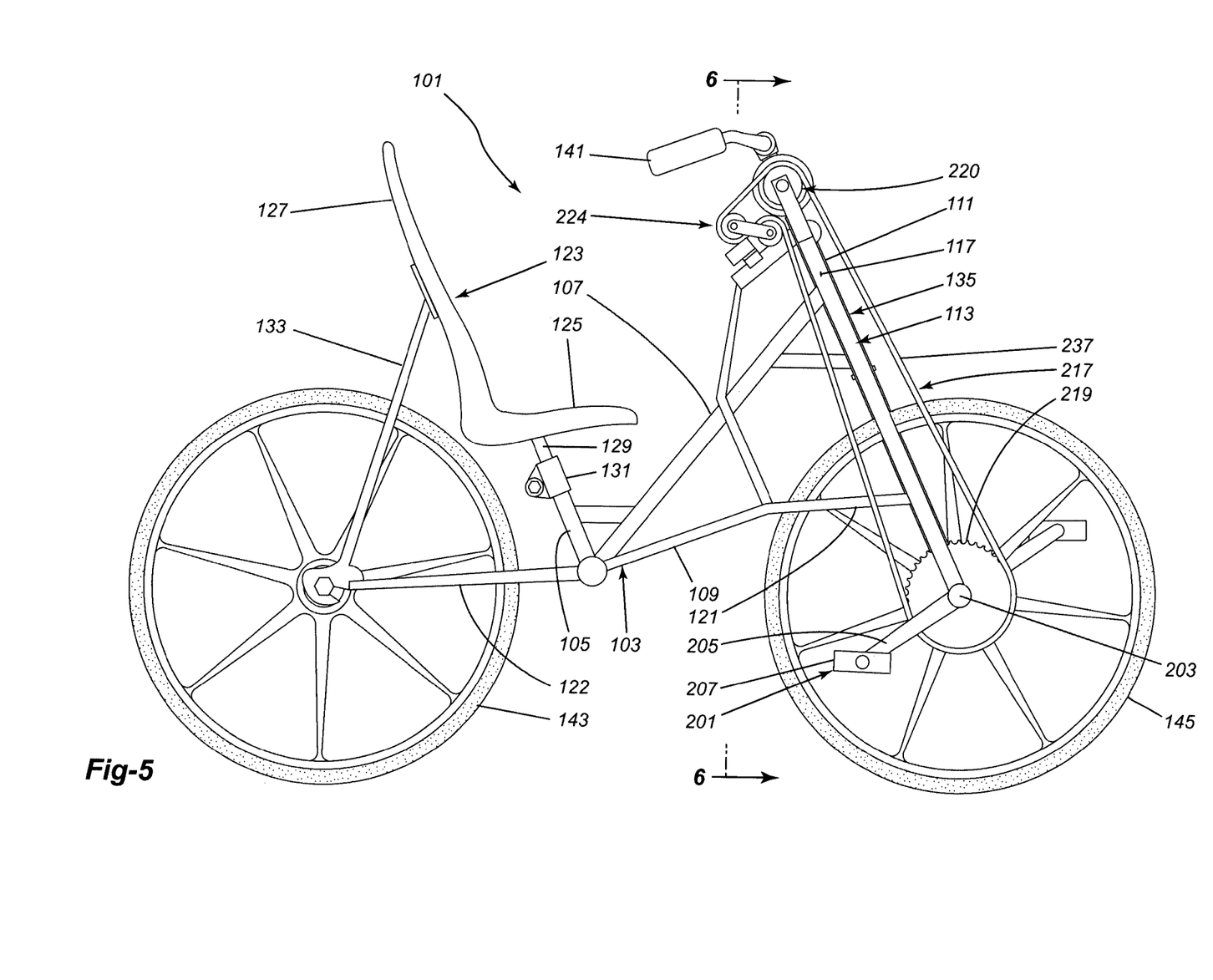
FIG. 5 is a side view of a preferred embodiment of the bicycle.
Figure 6:
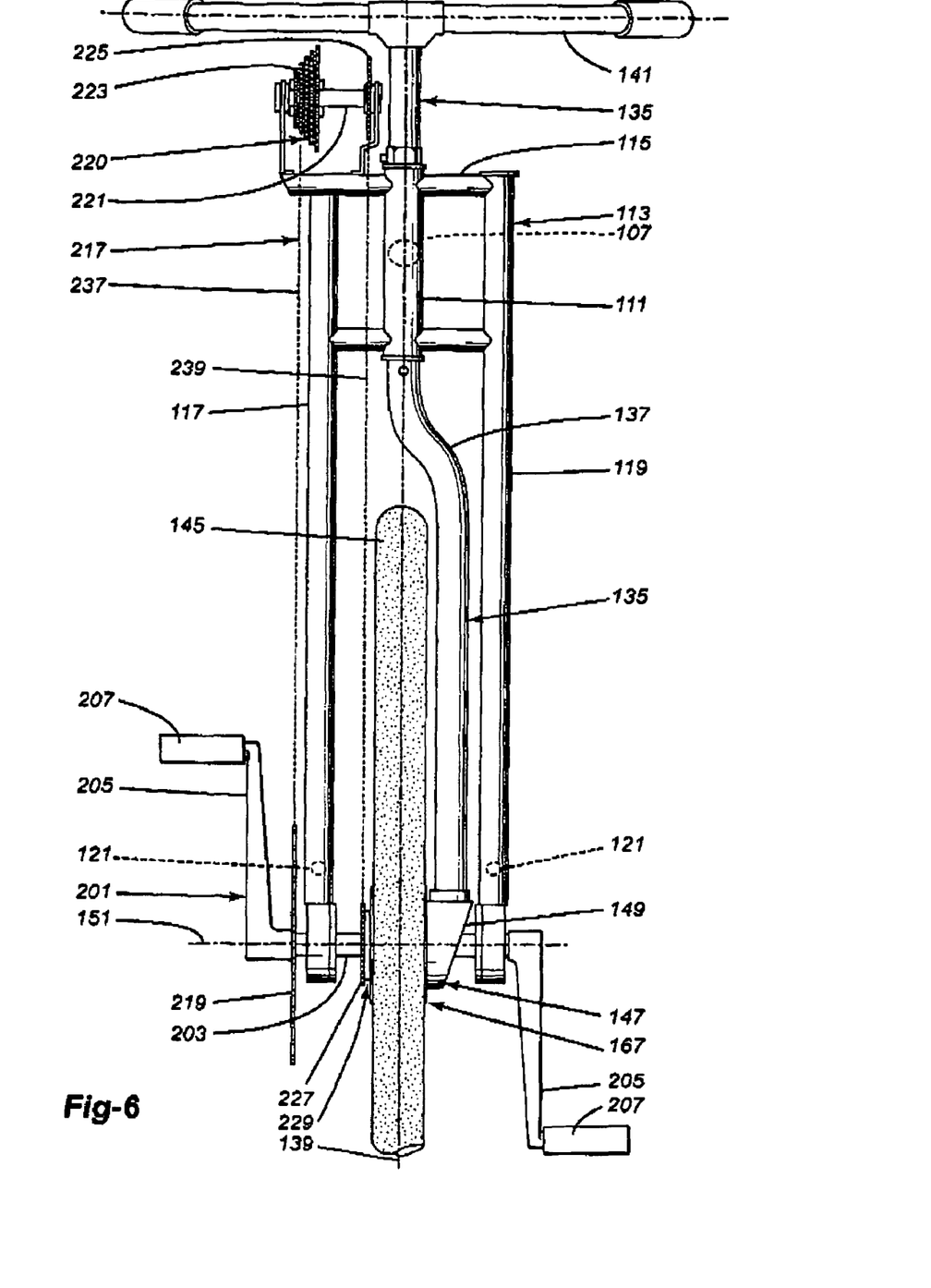
FIG. 6 is a partial front view of the bicycle.

Recumbent bicycles are slightly different in construction from the standard bicycle shown in FIG. 1. AS shown in FIGS. 5 and 6, the recumbent bicycle 101 has a frame 103 with a relatively short seat post 105. Top and bottom frame members 107, 109 extend upwardly and forwardly from the bottom of the seat post 105 to a relatively short steering post 111 and a front fork 113 respectively. The front fork 113 is supported by its top cross-bar 115 on the steering post 111 and both the steering post and the front fork are aligned, from the side, and extend slightly forwardly. The fork 113 has two parallel frame arms 117, 119, one on each side of the front post 111. The lower frame member 109 is forked at its front end, with the front two arms 121 of the lower frame member 109 connected to the frame arms 117, 119 of the front fork 113. The frame 103 also has a rear fork 122 extending rearwardly from the bottom of the seat post 105.

The bicycle has a seat 123 mounted on the seat post 105. Because the frame is open, not being closed by a top frame member similar to the frame member 9 shown in FIG. 1, the seat 123 can be located lower down in the frame 103. The seat 123 is of the bench type having a seat portion 125 and a back portion 127. The seat portion 123 is located to be about even with the tops of the wheels of the bicycle. The seat 123 is mounted by a mounting post 129 inserted into the seat post 105 and a clamp 131 on the seat post 105 locks the seat 123 at the right height. Braces 133 can extend upwardly from the rear of the rear fork 122 to the back portion 127 of the seat 123. The braces 133 can be adjustably mounted on the back portion allowing the height of the seat to be adjusted. The location of the seat 123 places the rider in a slightly recumbent position with his legs extending forwardly when pedaling as will be apparent.

A steering arm 135, substantially the same as the steering arm 17 shown in FIGS. 1 and 2, extends down through the front steering post 111, the arm 135 offset to one side just below the post 111, as shown at 137, to extend downwardly parallel to the longitudinal steering axis 139 of the steering post 111 but spaced a short distance from it. A handle bar 141 is connected to the top of the steering arm 135 above the post 111. The steering arm 135 is rotatable by the handle bar in the post 111 about the steering axis 139. A rear wheel 143 is rotatably mounted at the end of the rear fork 122, A front wheel 145 is rotatably mounted to the bottom end of the steering arm 135 as will be described, the front wheel 145 centered with respect to the steering axis 139 and adjacent the steering arm 135.

Figure 7:
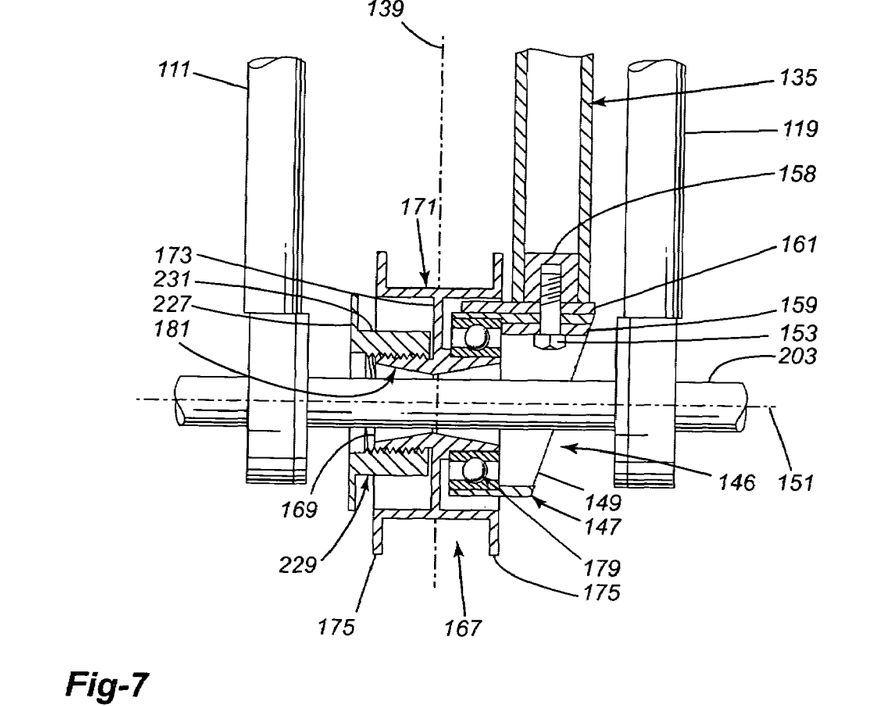
FIG. 7 is a detail front view, in partial cross-section, showing the wheel mounted on the steering arm.
Figure 8:
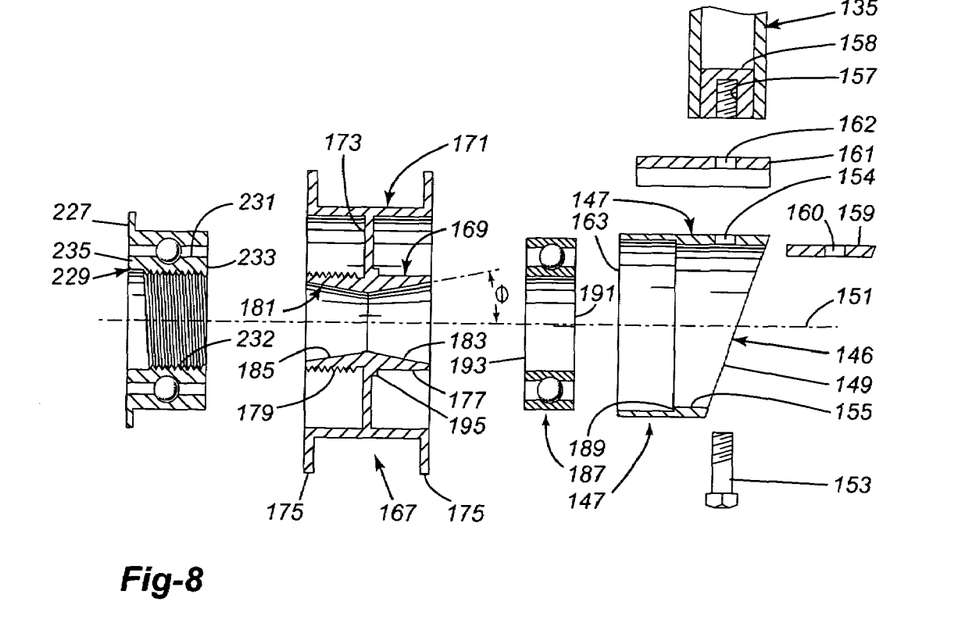
FIG. 8 is an exploded view of some of the elements shown in FIG. 7.

The front wheel 145 is mounted in cantilevered fashion to the bottom end of the steering arm 135 by a wheel mounting 146. The wheel mounting 146 has a cylindrical, tubular, wheel support 147 which is the same as the wheel support 47 shown in FIGS. 3 and 4. The wheel support 147 is connected adjacent one side 149 to the bottom of the steering arm 135 with its longitudinal axis 151 transverse to the steering axis 139 of the steering post 111. The wheel support 147, as shown in FIGS. 7 and 8, is connected by a bolt 153 passing through a hole 154 in the wall 155 of the support 147 into a threaded hole 157 in a mounting block 158 fixed in the bottom end of the steering arm 135. A curved inner support plate 159, with a hole 160 therein, can be mounted within the support 147 against wall 155, the bolt 153 passing through the hole 160. A curved outer support plate 161 is mounted onto the bottom end of the steering arm 135 against which the wheel support 147 can be located when being connected to the steering arm, the plate 161 also having a hole 162 through which the bolt 153 passes. The wheel support 147 extends past the steering arm 135 in cantilevered fashion when mounted thereon to have its other side 163 adjacent the steering axis 139. The support plate 161 can also extend past the steering arm 135 to support the cantilevered wheel support 147 against upward forces. The one side 149 of the wheel support can be angled to provide easier access to the bolt 153, the side 149 extending downwardly and toward the steering axis 139. The other side 163 of the wheel support 147 is parallel to the steering axis 139 while one arrangement has been used to connect the wheel support 147 to the steering arm 135, other arrangements can be used.

The front wheel 145 has an enlarged hub 167. The hub 167 has an inner, cylindrical, tubular member 169 and an outer, cylindrical, tubular member 171, the tubular members 169, 171 joined by a central flange 173. The outer tubular member 171 is centered with respect to the steering axis 139 when the wheel is mounted and has a radially outwardly directed flange 175 on each side to which the wheel spokes (not shown) of the front wheel 145 are attached. The inner tubular member 169, a part of the wheel mounting 146, forms a bearing support 177 on one side of the central flange 173 and a sprocket support 179 on the other side of the flange 173. The outer surface of the sprocket support 179 is threaded. The bore 181 through the inner tubular member 169 can be cylindrical but is preferably shaped to have diverging, truncated, conical sections 183, 185, the sections diverging from the approximate center of the bore 181. The sections 183, 185 diverge at an angle Ø of about 25°.

The front wheel 145 is rotatably mounted on the wheel support 147 on the steering arm 135 by inserting the bearing support 177 on the wheel hub 167 within the wheel support 147 from its other side 163 as shown in FIG. 7. The wheel mounting 146 includes a single, annular bearing 187 which is press-fit onto the bearing support 177 of the hub 167, and press-fit within the wheel support 147 to rotatably connect the wheel 145 to the wheel support 147. The wall 155 of the wheel support 147 can be counter bored inwardly from the other side 163 to provide a stop shoulder 189 to locate one side 191 of the bearing 187. The central flange 173 of the hub 167 lies closely adjacent the other side 163 of the wheel support 147 and the other side 193 of bearing 187. A stop shoulder 195 can be formed on the inner tubular member 169 adjacent the central flange 173 to slightly space the other side 193 of the bearing 187 from the flange 173. It will be seen that the bearing 187 is adjacent the steering axis 139.

The single bearing 187, and its location, provides good support for the front wheel 145 while minimizing friction generated when the wheel rotates.

Pedal means 201 are provided for operating the bicycle. The pedal means 201, as shown in FIGS. 5 and 6, has a pedal axle 203 that extends through the bottom ends of the frame arms 117, 119. Bearings, not shown, rotatably mount the axle 203 in the arms 117, 119. Each end of the pedal axle 203 has a pedal arm 205 non-rotatably mounted thereon, with a pedal 207 at the end of the arm 205. The pedal arms 205 and pedals 207 are located outside the frame arms 117, 119.

The pedal axle 203 passes freely through both the inner tubular member 169 on the wheel hub 167 and the wheel support 147. There is no connection between the pedal axle 203 and the wheel hub 167. The front wheel 145 can be easily turned relative to the pedal axle 203 because the diameter of the axle 203 is slightly less than the inner-most diameter of the inner tubular member 169 and because the bore 181 of the inner tubular member 169 has the diverging conical sections 183, 185 providing additional clearance for the axle 203 when the inner tubular member turns in either direction.

Drive means 217 connect the pedal means 201 to the front wheel 145 to propel the bicycle. The drive means 217, as shown in FIGS. 5 and 6 preferably comprises chain and sprocket drives and includes a first drive sprocket 219 fixedly mounted on the pedal axle 203 just outside one of the frame arms 117, 119. A first transfer sprocket means 220 is mounted above the drive sprocket 219 on a sprocket shaft 221 mounted on the frame 103 just below the handle bar 141. The first transfer sprocket means can comprise a set of speed change sprockets 223 mounted on one end of the sprocket shaft 221. The speed change sprockets 223 connect to the sprocket shaft 221 in the forward direction of rotation but freewheel on the shaft in a rearward direction of rotation allowing reverse pedaling.

A derailleur gear shift mechanism 224, mounted on the frame 103, is located behind the speed change sprockets 223 as shown in FIG. 5. The sprocket shaft 221 is mounted on the cross bar 115 connecting the frame arms 117, 119 to the steering post 111 and is located just below the handle bars 141 and to one side of the steering post 111. Second transfer sprocket means in the form of a transfer sprocket 225 is fixedly mounted on the other end of the sprocket shaft 221. A driven sprocket 227 is located below the transfer sprocket 225, the driven sprocket 227 mounted on a tubular sprocket carrier 229.

The sprocket carrier 229 is shown in FIGS. 7 and 8 and has a tubular body 231 with threads 232 on its inner surface adjacent one side 233. The driven sprocket 227 is on the other side 235 of the body 231 and is rotatable relative to the body 231. The sprocket 227 connects with body 231 in the forward direction when rotated in a forward direction to rotate the front wheel. The sprocket 227 can also remain stationary while the front wheel rotates. The sprocket 227-sprocket carrier 229 unit is a standard bicycle item, modified only to fit the sprocket support 179, so its inner workings are not shown. The carrier 229 is threadably mounted on the sprocket support 179 on the wheel hub 167. A first chain 237 connects the drive sprocket 219 to the speed change sprockets 223. A second chain 239 connects the transfer sprocket 225 to the driven sprocket 227. Operating the pedals means 201 will rotate the front wheel 145 through the drive means 217 to propel the bicycle.

The location of the speed change sprockets 223 adjacent the handle bars 141 allows the driver to use a hand to easily change the gear ratio of the drive means 217 and also to clearly see which gear is to be selected to provide the desired gear ratio. While the first transfer sprocket means 220 has been shown as a set of speed change sprockets 223 it could also be a single sprocket.

The construction described, using a single steering arm between the frame arms and a cantilevered support for the front wheel provides a relatively compact and light weight front wheel drive for the bicycle. The bicycle is efficiently driven with a large front wheel and the front wheel rolling on a single bearing, and is easily steerable without interference from the pedal means. The chains of the drive means passing between the pedal axle, the sprocket shaft and the driven sprocket will twist slightly when the front wheel is turned during steering but this twisting is not enough to affect operation of the bicycle. The location of the pedal means makes it comfortable for the driver to propel the bicycle from a recumbent position.

While the bearing support of the inner tubular member is said to be inserted into the wheel support in both embodiments described above, the hub and wheel support could be constructed and sized to have the wheel support fit within the bearing support with the annular bearing press-fit mounted on the wheel support and within the bearing support.

Figure 9:
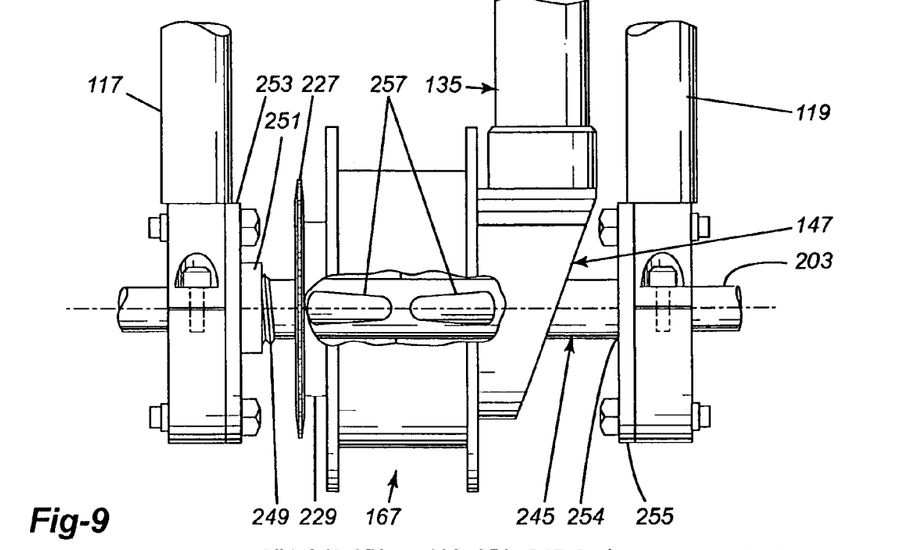
FIG. 9 is a detail front view, in partial cross-section, showing a reinforcement member associated with the pedal axle.
Figure 10:
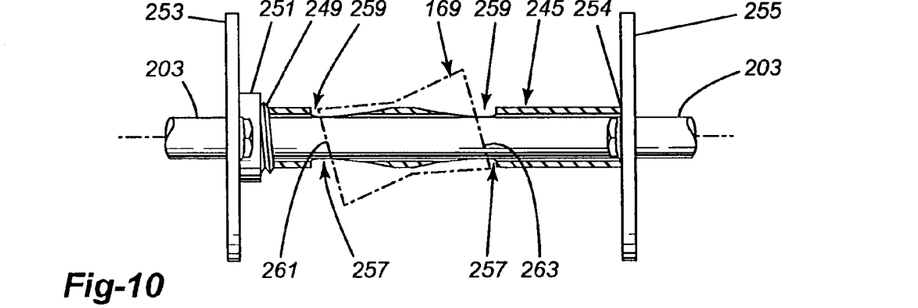
FIG. 10 is a partial cross-section view looking down on the reinforcement member shown in FIG. 9 but with the wheel turned.

The front fork 113 of the bicycle can be reinforced to strengthen it by mounting a reinforcement member in the form of a sleeve 245 over the pedal axle 203 between the frame arms 117, 119 of the front fork, as shown in FIGS. 9 and 10. One end of the sleeve 245 can be threaded as shown at 249 so the sleeve can be threadably mounted in a bushing 251 fixed on a flange 253 which flange is bolted to the inside of the free end of one frame arm 117. The other end 254 of the sleeve 245 is welded to another flange 255 which is fastened to the inside of the other frame arm 119. The central portion of the sleeve 245 can be apertured on either side of center at the front and back as shown by front apertures 257 and rear apertures 259. The apertures 257, 259 are sized and positioned to receive the sides 261, 263 of the inner tubular member 169 of the hub 167, as shown in FIG. 10, during turning so as to avoid limiting the turning radius when using the sleeve. The rigid sleeve 245 extends between the free ends of the frame arms 117, 119 to strengthen the fork, the threaded connection between the sleeve and the bushing 251 providing some adjustment. The axle 203 passes freely through the sleeve 245.

Figure 11:
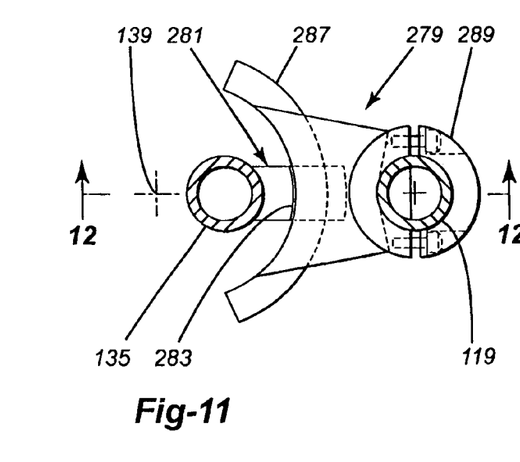
FIG. 11 is a partial top view showing another reinforcement arrangement between the steering arm and a frame arm.
Figure 12:
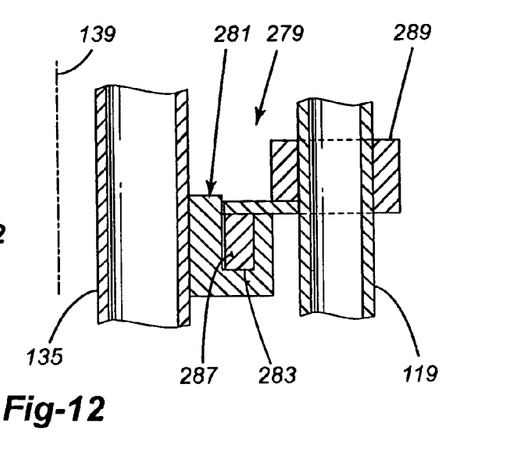
FIG. 12 is a cross-section view taken along 12-12 in FIG. 11.

To further strengthen the front of the frame of the bicycle a connection can be provided between the steering arm 135 and the adjacent frame arm 119 near their free ends. The connection 279, as shown in FIGS. 11 and 12 can comprise a slotted member 281 fixed, as by welding, to the outside of the steering arm 135 adjacent the frame arm. The member 281 is just above wheel mounting 149. The slot 283 in the slotted member 281 is curved about the steering axis 139 of the front wheel. A guide arm 287 is mounted on the inside of the frame arm 119. The guide arm 287 can be mounted by an adjustable bracket 289 onto the frame arm 119. The guide arm 287 is relatively long, is curved with the same curvature as the slot 283, and is received snugly within the slot 283 to allow the slotted member 281 to slide along the arm 287 as the wheel is turned to steer the bicycle. The slotted member 281 and curved guide arm 287 maintain a connection between the steering arm 135 and the frame arm 119 even during turning.

Figure 13:
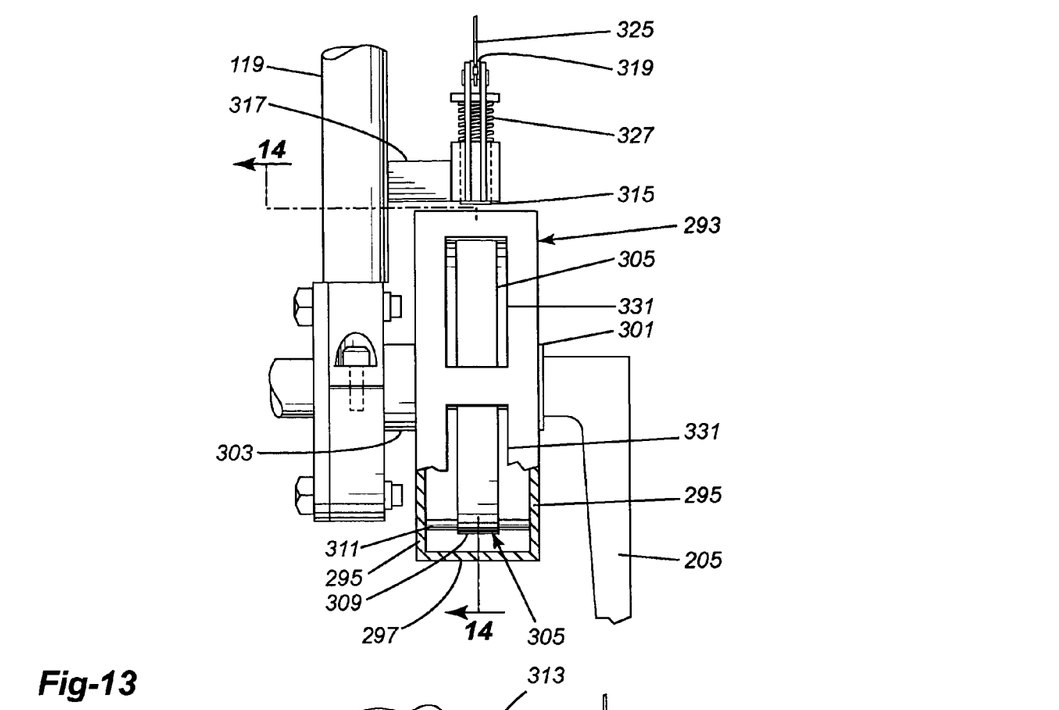
FIG. 13 is a detail front view of the bike showing a boost mechanism mounted on the pedal axle.
Figure 14:
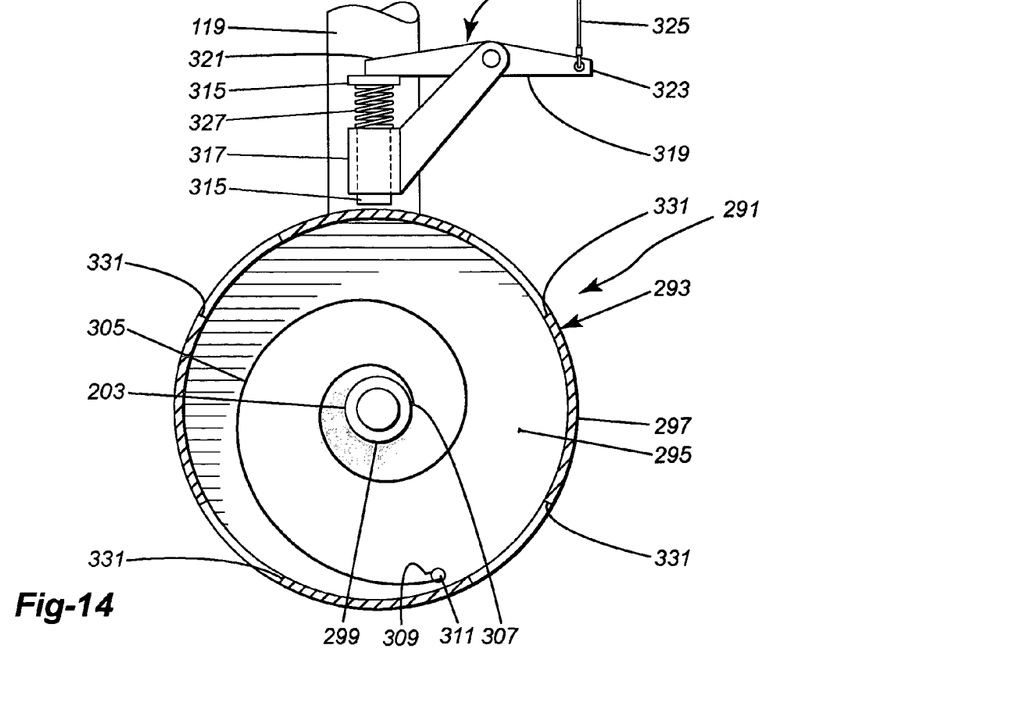
FIG. 14 is a cross-section view taken along line 14-14 in FIG. 13.

If desired, the bicycle can be equipped with a boost mechanism. The boost mechanism 291, as shown in FIGS. 13 and 14 is mounted on the pedal axle 203 between a pedal arm 205 and a frame arm 119. The mechanism 291 has a cylindrical casing 293 with parallel circular side walls 295 and an annular end wall 297. A central bushing 299 is rotatably mounted between the side walls 295, the bushing 299 fixed by suitable means on the pedal axle 203. The casing 293 is rotatably mounted between a washer 301 adjacent the pedal arm 205 and a spacer 303 adjacent the frame arm 119. A Coil spring 305 is provided within the casing 293 with one end 307 fixed to the bushing 299 and the other end 309 fixed to the side walls 295 of the casing via a pin 311 adjacent the end wall 297.

Brake means 313 selectively prevent rotation of the casing 293 with the pedal axle 203 to cause the spring 305 to be wound up when the pedal axle 203 is rotated about a turn in a reverse or non bicycle-driving direction. The brake means 313 can comprise a pin 315 slidably mounted in a support 317 fixed to the frame arm 119. A biasing arm 319 is pivotably mounted on the support 317 with one end 321 of the arm 319 on top of the pin 315 and the other end 323 of the arm connected via a control cable 325 to an actuating lever (not shown) on the handle bar. A spring 327 is located between the pin 315 and the support 317 to bias the pin up from the support. One or more holes 331 are provided in the end wall 297 of the casing 293.

When a person driving the bike comes to a stop, such as at a stop light, he can pull up on the biasing arm 319, via cable 325, causing it to move the pin 315 down against the spring 327 to abut the end wall 297 of the casing 293. Reverse pedaling will rotate both the pedal axle and the casing 293 in a non-driving direction until the pin 315 enters a hole 331 in the casing end wall 297 to stop rotation of the casing 293. Continued reverse pedaling will wind up the coil spring 305. When the person wants to start to move forward again, he pedals in the forward direction, the coil spring 305 unwinding to release energy to help start movement of the bike. The arm 319 is then released releasing the pin 315 from the casing 293 and allowing it to rotate with the axle. While one form of brake means has been described, other forms could be used.

The recumbent bicycle described has a relatively low yet comfortable seat to place the driver in a somewhat recumbent position. The hub arrangement for the front wheel, using only a single bearing to rotatably mount the wheel, makes the bicycle extremely easy to pedal. The bicycle is also easy to steer, the pedal axle normally not interfering with the wheel being turned. The frame structure of the bicycle at the front is also quite strong, even though the fork arms and steering arm are cantilevered. The sleeve, mounted over the axle and between the frame arms, when employed, makes the front frame structure stronger as does the connection between the steering arm and the one of the frame arms.

The drive means has been described as connecting the pedal means to the front wheel. The drive means could instead connect the pedal means to the rear wheel. The drive sprocket on the pedal axle could drive a chain connected by suitable guide means and guide sprockets mounted on the frame to a driven sprocket on the rear wheel of the bicycle. The chain would pass upwardly from the drive sprocket to a guide sprocket mounted on one of the frame arms near the top of the frame arm so as not to interfere with the steering of the front wheel. The chain would then pass rearwardly from the first guide sprocket to the driven sprocket. Driving the rear wheel instead of the front wheel will eliminate the driven sprocket from the front wheel hub assembly allowing the single support bearing to be centrally located with respect to the steering axis.

While a recumbent bicycle has been described, the single steering arm-front wheel mounted pedal means arrangement can be used in other types of bicycles and even tricycles.

I claim:

1. A bicycle having: a frame; a rear wheel supported by the frame; a short steering post at the top front of the frame; a steering arm rotatably mounted in the post and extending downwardly away from the frame, the steering arm below the post offset to the side of the longitudinal axis of the steering post so that the front wheel can be centered on the axis of rotation of the steering arm; a cylindrical, tubular, wheel support at the end of the arm, the wheel support mounted adjacent one end to the end of the arm and extending transversely away from the arm; a front wheel having a hub with a cylindrical, tubular, bearing support on the hub and substantially within the hub, the bearing support insertable into the wheel support; a single, annular, bearing mounted between the bearing support and the wheel support for rotatably mounting the front wheel on the end of the steering arm, the bearing laterally offset from the steering arm; and two frame arms extending down from the top, front of the frame, one frame arm on each side of the steering arm and the front wheel located between the steering arm and one of the frame arms, pedal means mounted on the bottom ends of the frame arms, the pedal means having a pedal axle extending unattached through the tubular bearing support on the wheel hub and the tubular wheel support without connecting to either one, and pedals attached to the ends of the pedal axle outside of the frame arms.

2. A bicycle as claimed in claim 1 including drive means connecting the pedal axle to one of the front and rear wheels to rotate the wheel when pedaling.

3. A bicycle as claimed in claim 1 including drive means connecting the pedal axle to the front wheel hub to rotate the front wheel when pedaling.

4. A bicycle as claimed in claim 3 wherein the drive means has a first drive sprocket mounted on the axle, a driven sprocket fixedly mounted on the wheel hub, first and second transfer sprocket mean mounted on a sprocket axle, the sprocket axle mounted on the frame to be parallel to the pedal axle, first chain means connecting the drive sprocket to the first transfer sprocket means and second chain means connecting the second transfer sprocket means to the driven sprocket.

5. A bicycle as claimed in claim 4 wherein one of the first and second transfer sprocket means is a derailleur sprocket system for changing speeds.

6. A bicycle as claimed in claim 5 wherein the sprocket axle is mounted on the front top part of the frame near the steering post.

7. A bicycle as claimed in claim 4 wherein the hub has an inner tubular member with the side of the member adjacent the wheel support forming the tubular bearing support, and the other side of the member forming a driven sprocket support.

8. A bicycle as claimed in claim 7 wherein the bore of the inner tubular member is shaped into two diverging, truncated conical spaces, the spaces diverging from each other and from about the center of the member.

9. A bicycle as claimed in claim 1 including a reinforcing tubular member extending between the free ends of the frame arms and concentric with the pedal axle, the reinforcing member passing freely through the wheel support and the bearing support without connecting to either one; the ends of the reinforcing member connected to the ends of the arms.

10. A bicycle as claimed in claim 9 wherein the reinforcing member has a pair of holes in both its front side and back side to receive portions of the inner tubular member when the wheel is turned relative to the pedal axle.

11. A bicycle as claimed in claim 1 including connecting means between the steering arm and the frame arm near the pedal means, the connecting means comprising a slotted member on the outside of the steering arm facing the adjacent frame arm, the slot in the slotted member curved about the steering axis of the steering post, a guide arm mounted on the inside of the adjacent frame arm, the guide arm curved with the same curvature as the slot and snugly received in the slot to allow the slotted member to slide along the guide arm as the wheel is turned to steer the bicycle.

12. A bicycle as claimed in claim 1 wherein the outer diameter of the single annular bearing is no greater than three inches.

13. A bicycle as claimed in claim 1 having a seat mounted on the frame between the front and back wheels, the seat being a bench type seat having a seat portion and a back portion with the seat portion located about even with the top of the wheels to place the driver in a recumbent driving position.

14. A bicycle having a frame, the frame supporting a rear wheel, the frame having a top, front steering post and two frame arms extending down from the frame adjacent the steering post, one frame arm on each side of the post; a steering arm rotatably mounted in the steering post and extending down between the frame arms and alongside one of the frame arms; a tubular wheel support on the end of the steering arm, the wheel support extending transversely from the steering arm toward the other frame arm; a front wheel with a hub and a single annular bearing connecting the hub to the tubular support to have the wheel rotatable about the tubular support between the frame arms, pedal means mounted on the bottom ends of the frame arms, the pedal means having a pedal axle rotatably supported by the bottom ends of the frame arms and passing freely through the wheel hub and the tubular support without connecting with them; and drive means connecting the pedal axle to one of the front and rear wheels to rotate the wheel when pedaling.

15. A bicycle as claimed in claim 14 wherein the drive means is connected to the wheel hub of the front wheel.

16. A bicycle as claimed in claim 15 including a reinforcing tubular member extending between the bottom ends of the frame arms and concentric with the pedal axle, the reinforcing member passing freely through the wheel support and the bearing support; the ends of the reinforcing member connected to the ends of the arms.

17. A bicycle as claimed in claim 16 wherein the reinforcing member has a pair of holes in both its front side and back side to receive portions of the wheel hub when the wheel is turned relative to the pedal axle.

18. A bicycle as claimed in claim 15 including connecting means between the steering arm and the one frame arm near the pedal means, the connecting means comprising a slotted member on the outside of the steering arm facing the frame arm, the slot in the slotted member curved about the steering axis of the steering post, a quide arm mounted on the inside of the frame arm, the guide arm curved with the same curvature as the slot and snugly received in the slot to allow the slotted member to slide along the guide arm as the wheel is turned to steer the bicycle.

19. A bicycle as claimed in claim 15 wherein the drive means has a first drive sprocket mounted on the axle, a driven sprocket fixedly mounted on the wheel hub, first and second transfer sprocket means mounted on a sprocket axle, the sprocket axle mounted on the frame to be parallel to the pedal axle, and first chain means connecting the drive sprocket to the first transfer sprocket means and second chain means connecting the second transfer sprocket means to the driven sprocket.

20. A bicycle as claimed in claim 15 wherein the outer diameter of the annular bearing is no greater than three inches.

\* \* \* \* \*